US008999570B2

(12) United States Patent
Baek

(10) Patent No.: US 8,999,570 B2
(45) Date of Patent: Apr. 7, 2015

(54) BATTERY PACK EXHIBITING ENHANCES STRUCTURAL STRENGTH

(75) Inventor: Woon-Seong Baek, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 456 days.

(21) Appl. No.: 12/912,232

(22) Filed: Oct. 26, 2010

(65) Prior Publication Data

US 2011/0129696 A1 Jun. 2, 2011

(30) Foreign Application Priority Data

Nov. 30, 2009 (KR) .......................... 10-2009-0116670

(51) Int. Cl.
*H01M 2/02* (2006.01)
*H01M 2/06* (2006.01)
*H01M 2/30* (2006.01)
*H01M 2/34* (2006.01)

(52) U.S. Cl.
CPC .............. *H01M 2/34* (2013.01); *H01M 2/0207* (2013.01); *H01M 2200/00* (2013.01)

(58) Field of Classification Search
USPC ........ 429/100, 163, 162, 178, 179, 185, 7, 97
See application file for complete search history.

(56) References Cited

U.S. PATENT DOCUMENTS

| | | | | |
|---|---|---|---|---|
| 4,582,767 A | * | 4/1986 | Morioka et al. | 429/121 |
| 6,743,546 B1 | * | 6/2004 | Kaneda et al. | 429/127 |
| 2004/0142239 A1 | * | 7/2004 | Morita et al. | 429/181 |
| 2005/0112415 A1 | | 5/2005 | Takeshita et al. | |
| 2008/0061735 A1 | * | 3/2008 | Toya et al. | 320/108 |
| 2008/0090139 A1 | * | 4/2008 | Hurst et al. | 429/156 |
| 2008/0102368 A1 | * | 5/2008 | Sumida et al. | 429/178 |
| 2008/0241654 A1 | * | 10/2008 | Koh et al. | 429/100 |
| 2008/0261087 A1 | | 10/2008 | Jang et al. | |
| 2009/0081539 A1 | | 3/2009 | Koh et al. | |
| 2009/0092896 A1 | | 4/2009 | Koh et al. | |
| 2009/0111018 A1 | * | 4/2009 | Park et al. | 429/179 |
| 2009/0258285 A1 | * | 10/2009 | Kim | 429/97 |

FOREIGN PATENT DOCUMENTS

| | | | | |
|---|---|---|---|---|
| CN | 1670983 | | 9/2005 | |
| CN | 101276888 A | | 10/2008 | |
| CN | 101425601 A | | 5/2009 | |
| CN | 101510595 A | | 8/2009 | |
| EP | 1524710 A2 | * | 4/2005 | H01M 2/10 |

(Continued)

OTHER PUBLICATIONS

Machine Translation of: JP 2006/210218 A, Kiyota, Aug. 10, 2006.*

(Continued)

*Primary Examiner* — Kenneth Douyette
(74) *Attorney, Agent, or Firm* — Knobbe Martens Olson & Bear

(57) ABSTRACT

There is provided a battery pack in which a pair of ribs are formed at an inner frame to extend toward plane portions of a bare cell, so that the inner frame can be fixed at the exact position of the bare cell. In one embodiment, a battery pack includes a bare cell having a pair of first side portions opposite to each other, a pair of second side portions opposite to each other, and a pair of plane portions opposite to each other. The second side portions and the plane portions are connected to ends of the first side portions. A protection circuit module is electrically connected to the bare cell. An inner frame is provided between the bare cell and the protection circuit module. The inner frame has at least a pair of ribs opposite to each other while extending toward the plane portions of the bare cell.

18 Claims, 3 Drawing Sheets

(56) References Cited

FOREIGN PATENT DOCUMENTS

| | | | |
|---|---|---|---|
| EP | 1524710 A2 | 4/2005 | |
| EP | 1 895 610 A1 | 3/2008 | |
| EP | 2 207 222 A1 | 7/2010 | |
| JP | 2005-142153 A | 6/2005 | |
| JP | 2006210218 A * | 8/2006 | ............ H01M 2/10 |
| JP | 2007-157452 | 6/2007 | |
| JP | 2007-157452 A | 6/2007 | |
| JP | 2009-110955 A | 5/2009 | |
| KR | 10-0835743 | 5/2008 | |
| KR | 1020080040581 | 5/2008 | |
| KR | 1020090075396 | 7/2009 | |

OTHER PUBLICATIONS

Japanese Office Action dated Aug. 14, 2012 for Japanese Patent Application No. JP 2010-037258 which shares priority of Korean Patent Application No. KR 10-2009-0116670 with captioned U.S. Appl. No. 12/912,232.

Office Action dated Jan. 19, 2012 for corresponding KR Application No. 10-2009-0116670.

Extended EP Search Report dated Mar. 1, 2011 for corresponding EP Application No. 10191816.7.

Office Action dated Apr. 25, 2011 for corresponding Korean Patent Application No. 10-2009-0116670.

Office Action dated Dec. 7, 2011 for corresponding Korean Application No. 10-2009-0116670.

Office Action dated Mar. 11, 2013 for corresponding CN Application No. 201010557065.8.

Office Action dated Nov. 5, 2013 for corresponding CN Application No. 201010557065.8.

* cited by examiner

BATTERY PACK EXHIBITING ENHANCES STRUCTURAL STRENGTH

RELATED APPLICATIONS

This application claims priority to and the benefit of Korean Patent Application No. 10-2009-0116670, filed on Nov. 30, 2009, in the Korean Intellectual Property Office, the entire content of which is incorporated herein by reference.

BACKGROUND

1. Field

An aspect of the present invention relates to a battery pack, and more particularly, to a battery pack capable of enhancing precision when components are assembled.

2. Description of the Related Art

As the development and demand of mobile devices have recently been increased, demands on secondary batteries have been rapidly increased as energy sources.

Battery packs are generally classified into a hard battery pack and an inner battery pack based on how the secondary battery is mounted to a case. Among them, the inner battery pack is mounted in an external device, and then hidden by a cover, which forms a part of the external device. Therefore, it is inconvenient to mount the inner battery pack in the external device. However, it is easy to design the inner battery pack, and the inner battery pack has high compatibility with the external devices.

Generally, an inner battery pack includes a bare cell that can be repeatedly charged and discharged; a protection circuit module electrically connected to the bare cell so as to control charge or discharge of the bare cell and to block a circuit when the bare cell is overcharged or overdischarged; a resin filled in the gap between the bare cell and the protection circuit module; and an outer frame for packing the bare cell, protection circuit module and the resin so that the inner battery pack is mounted in an external device.

In order to manufacture such a battery pack, in the state that an electrode lead and a PTC thermistor are connected to a positive electrode and a negative electrode, respectively, a circuit protection module is electrically connected to the lead and the PTC thermistor. Then, the protection circuit module and the bare cell are mechanically fixed to each other by filling a resin in the gap between the protection circuit module and the bare cell so that the protection circuit module is not separated from the bare cell. The bare cell and the protection circuit module, which are formed into a single body, are packed by an outer frame formed to be mounted in an external device. Here, the outer frame is integrally molded with the bare cell, the protection circuit module and the resin using additional resin.

Battery packs may be manufactured in various shapes in accordance with customers' demands on their appearances. Recently, it has been required to develop battery packs that are easier to assemble the components and have a strong shape.

SUMMARY

In one embodiment, there is provided a battery pack in which a pair of ribs are formed at an inner frame to extend toward plane portions of a bare cell, so that the inner frame can be fixed at the exact position of the bare cell.

According to an aspect of the present invention, there is provided a battery pack including a bare cell having a pair of first side portions opposite to each other, a pair of second side portions opposite to each other, and a pair of plane portions opposite to each other, the second side portions and the plane portions being connected to ends of the first side portions; a protection circuit module electrically connected to the bare cell; and an inner frame provided between the bare cell and the protection circuit module, the inner frame having at least a pair of ribs opposite to each other while extending toward the plane portions of the bare cell.

An electrode terminal may be formed at one side portion of the second side portions.

The inner frame may be formed at one side portion of the first side portions in the bare cell.

The inner frame may be formed at one side portion of the first side portions and the pair of the second side portions.

The ribs may be formed to extend by a length of about 3 to 10 mm toward the plane portions of the bare cell.

The inner frame and the protection circuit module may be attached to each other by welding or insulating tape.

The battery pack may further include an outer frame that accommodates the bare cell, the protection circuit module and the inner frame, and is formed so that the pair of plane portions of the bare cell are exposed.

The outer frame may be separately provided with an upper outer frame and a lower outer frame, and formed by connecting the upper and lower outer frames to each other. Alternatively, the outer frame may be formed in a single body.

At least one projection positioned perpendicular to the plane portions of the bare cell may be formed on the inner frame that comes in contact with the first side portion of the bare cell, and a hole may be formed at the position of the outer frame, corresponding to the projection.

The battery pack may further include a taping member for surrounding the outside of the bare cell and the outer frame.

The inner and outer frames may be formed of any one selected from the group consisting of polycarbonate (PC), polyethylene terephthalate glycol (PETG), polyethylene (PE), polypropylene (PP) and acrylonitrile-butadiene-styrene (ABS).

As described above, in a battery pack according to an embodiment of the present invention, a pair of ribs are formed at an inner frame to extend toward plane portions of a bare cell, and thus, the inner frame is fixed at the exact position of the bare cell. Accordingly, it is possible to decrease the failure rate of the battery pack that is a final product, and it is possible to reduce movements of the bare cell, thereby obtaining a strong product.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
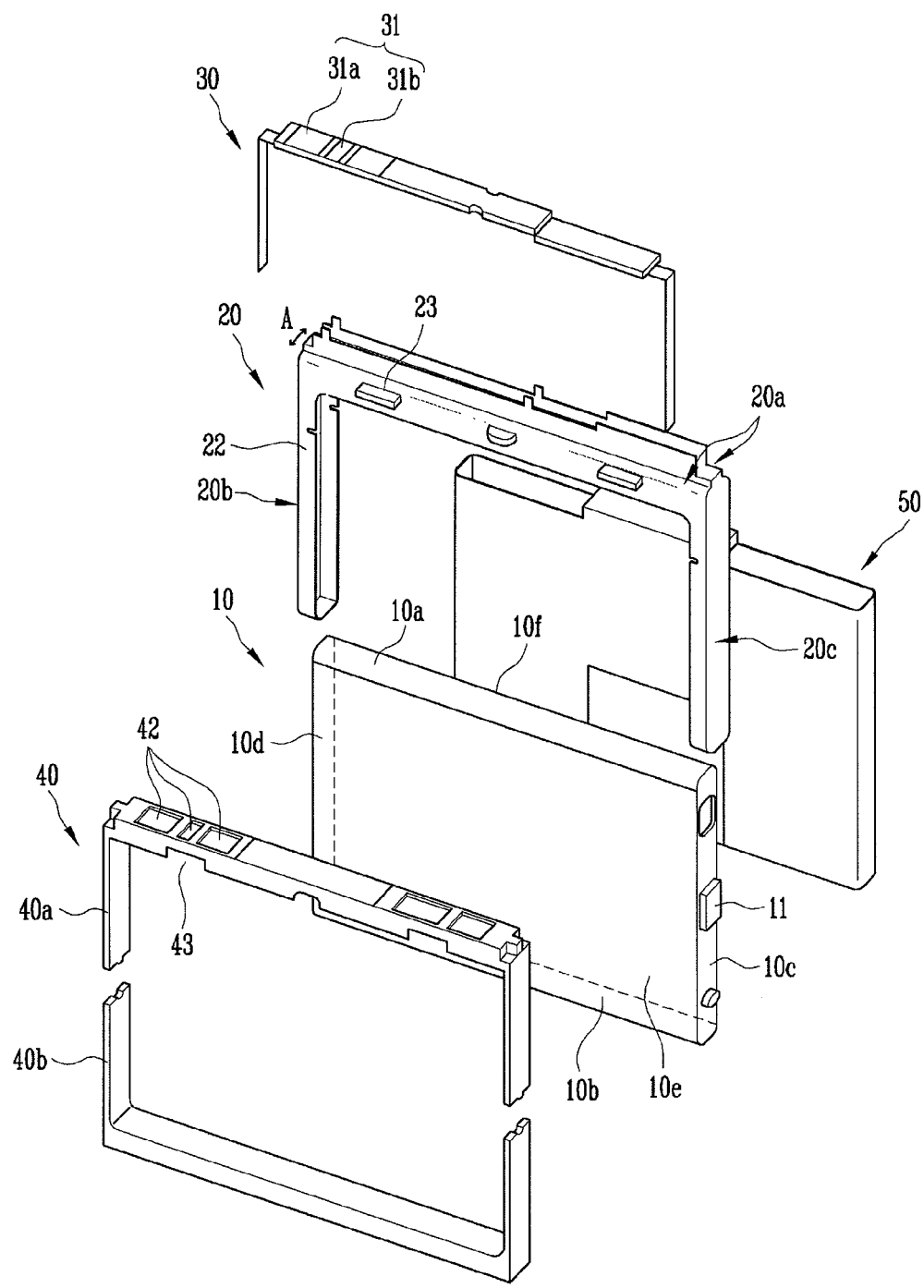
FIG. 1 is an exploded perspective view of a battery pack according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

FIG. 1 is an exploded perspective view of a battery pack according to an embodiment of the present invention.

Referring to FIG. 1, the battery pack of this embodiment includes an electrode assembly; a bare cell 10 having a can or pouch surrounding the outer circumferential surface thereof; a protection circuit module 30 electrically connected to the bare cell 10; an inner frame 20; and an outer frame 40.

The bare cell 10 is provided with a pair of first side portions 10a and 10b opposite to each other; a pair of second side portions 10c and 10d connected to end portions of the first side portions 10a and 10b and opposite to each other; a pair of plane portions 10e and 10f opposite to each other; and an electrode terminal 11 exposed to one side portion 10c of the second side portions 10c and 10d.

Figure 4:
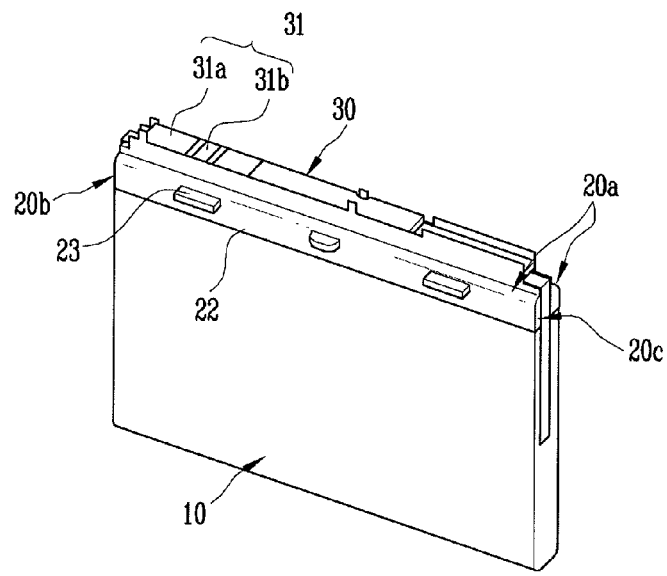
FIG. 4 is a perspective view illustrating the assembled state of a bare cell and an inner frame according to still another embodiment of the present invention.

The inner frame 20 is formed in a "C" or '⊏' shape so that one side portion 10b of the pair of first side portions 10a and 10b in the bare cell 10 and the pair of plane portions 10e and 10f are exposed. The protection circuit module 30 is mounted on the outside of the inner frame 20. At this time, the inner frame 20 and the protection circuit module 30 may be attached to each other by welding or insulating tape. In this embodiment, it has been described that the inner frame 20 is formed in a "C" or '⊏' shape so that one side portion 10b of the pair of first side portions 10a and 10b in the bare cell 10 and the pair of plane portions 10e and 10f are exposed. However, as illustrated in FIG. 4, the inner frame 20 may be formed in a line or '-' shape that comes in contact with one side portion 10a of the first side portions 10a and 10b in the bare cell 10.

The inner frame 20 is provided with ribs 22 extended toward the plane portions 10e and 10f from three pairs of sides 20a, 20b and 20c opposite to each other. The ribs 22 may serve as a guide so that the inner frame 20 can be joined with the bare cell 10 without leaning to any one side in direction 'A', i.e., with reduced error. In this embodiment, the ribs 22 of the inner frame 20 are formed to extend from all the sides 20a, 20b and 20c that come in contact with the plane portions 10e and 10f of the bare cell 10, and therefore, movements of the bare cell 10 are inhibited. Accordingly, the inner frame 20 can be firmly joined with the bare cell 10. Further, the bare cell 10 can be fixed to the inner frame 20 without a separate adhesive member.

The outer frame 40 is separately provided with a first or upper outer frame 40a and a second or lower outer frame 40b so that they are connected to each other. Thus, the outer frame 40 can accommodate the bare cell 10 having the protection circuit module 20 and inner frame 10 mounted thereon while surrounding the bare cell 10. A terminal exposing portion 42 may be provided to the outer frame 40. Here, the terminal exposing portion 42 allows an external input/output terminal portion 31, which will be described later, to be exposed to the exterior of the outer frame 40.

In this embodiment, it has been described that the outer frame 40 is separately provided with the upper outer frame 40a and the lower outer frame 40b so that they are connected to each other. However, the outer frame 40 may be formed in a square-like or '☐' shape so that the pair of plane portions 10e and 10f of the bare cell 10 are exposed.

The inner frame 20 functions to isolate the bare cell 10 from the protection circuit module 30, and the outer frame 40 is provided to maintain the profile and strength of the battery pack. The inner and outer frames 20 and 40 may be formed of any one selected from the group consisting of polycarbonate (PC), polyethylene terephthalate glycol (PETG), polyethylene (PE), polypropylene (PP) and acryonitrile-butadiene-styrene (ABS). Accordingly, when the outer frame 40 is formed in a single body, the inner and outer frames 20 and 40 can be easily joined with the bare cell 10 by a slight elastic force generated from the aforementioned material.

Projections 23 positioned perpendicular to the plane portions 10e and 10f of the bare cell 10 are formed on one side of the inner frame 20, which comes in contact with the first side portion 10a of the bare cell 10. Holes 43 are further formed at portions of the outer frame 40, corresponding to the projections 23. Thus, the inner and outer frames 20 and 40 can be more firmly joined with the bare cell 10.

Hereinafter, the bare cell 10 and the protection circuit module 30 will be described.

The bare cell 10 is provided with the electrode terminal 11, and the electrode terminal 11 is electrically connected to the protection circuit module 30. The inner frame 20 is positioned between the bare cell 10 and the protection circuit module 30, so that all the region except for the electrode terminal 11 are isolated from the protection circuit module 30. The protection circuit module 30 includes an electrical connection terminal (not shown) provided for the purpose of electrical connection with the electrode terminal 11 of the bare cell 10. The protection circuit module 30 further includes an external input/output terminal portion 31 positioned on the electrical connection terminal.

The bare cell 10 includes an electrode assembly and a can for accommodating the electrode assembly. The electrode assembly includes a positive electrode plate having both surfaces coated with a positive electrode active material; a separator; and a negative electrode plate having both surfaces coated with a negative electrode active material. Electrode tabs are joined with regions extended from the positive and negative electrode plates, respectively. One of the electrode tabs is connected to the can or a cap plate. The other of the electrode tabs is connected to the electrode terminal 11 and extracted to the exterior of the can so as to be electrically connected to the protection circuit module 30.

The protection circuit module 30 is seated on the outside of the inner frame 20 formed so as to be positioned over one side portion 10a of the pair of first side portions 10a and 10b and the pair of second side portions 10c and 10d in the bare cell 10. At this time, the protection circuit module 30 may be attached to the inner frame 20 by welding or insulating tape.

The protection circuit module 30 is physically connected to the electrode terminal 11 of the bare cell 10 and electrically connected to the electrode terminal 11 of the bare cell 10. The protection circuit module 30 includes a printed circuit board (of which reference numeral not shown). On the printed circuit board is a protection circuit such as a circuit for controlling charge and discharge of a battery to have a uniform charge state or a circuit for preventing overdischarge and overcharge. The protection circuit module 30 may have a protection element such as a thermistor or temperature fuse. When the voltage or current of a battery are higher than the specified voltage or current due to the high temperature or overcharge/overdischarge of the battery, the protection element cuts off the current, so that it is possible to prevent risks such as explosion and firing of the battery. The protection circuit module 30 has an electrical connection terminal (not shown) provided to allow the electrode tabs of the bare cell 10 to be electrically connected to the printed circuit board.

The protection circuit module 30 is used to transmit and receive electrical signals between the bare cell 10 and an external device (not shown). To this end, the protection circuit module 30 further includes an external input/output terminal 31 positioned on the electrical connection terminal. Here, the external input/output terminal 31 serves as an electrical medium between the protection circuit module 30 and the external device. The external input/output terminal portion 31 includes metal portions 31a and a housing portion 31b that surrounds the metal portions 31a. The metal portions 31a are plated with gold (Au) that is a conductive material so as to allow electrical signals to be transmitted/received between the bare cell 10 and the external device. The housing portion 31b is made of plastic that is an insulative material so that the metal portions 31a spaced apart from each other at a predetermined interval in the housing portion 31b are isolated from each other.

As described above, the outer frame 40 for forming a portion of the profile of the battery pack is joined with the bare cell 10 electrically connected to the protection circuit module 30 with the inner frame 20 interposed therebetween. The bare cell 10 and an outside of the outer frame 40 are also surrounded by a taping member 50, thereby reinforcing the joint between the bare cell 10 and the external frame 40.

Figure 2:
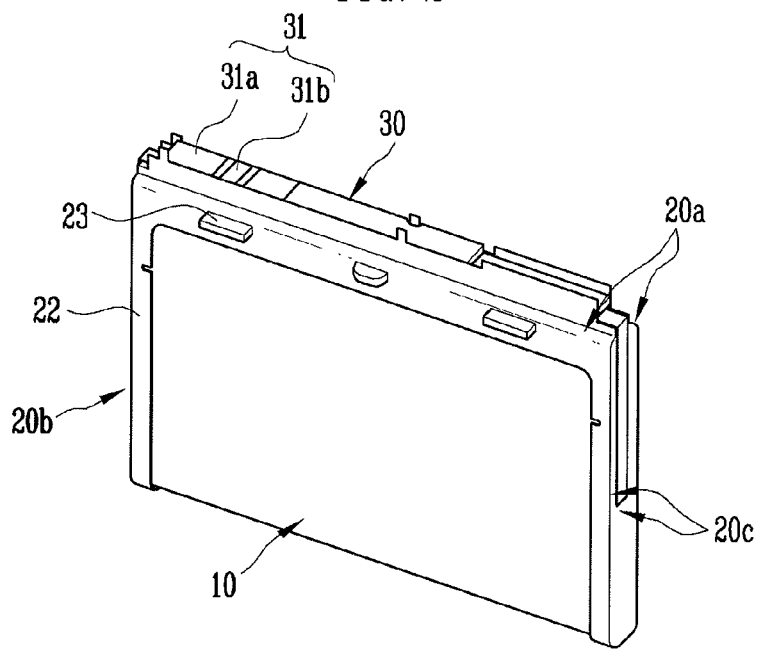
FIG. 2 is a perspective view illustrating the assembled state of a bare cell and an inner frame according to the embodiment of the present invention.

FIG. 2 is a perspective view illustrating the assembled state of a bare cell and an inner frame according to the embodiment of the present invention.

Referring to FIG. 2, the inner frame 20 is formed in a '⊏' shape so that the pair of plane portions 10e and 10f and one side portion 10b of the first side portions 10a and 10b are exposed. The ribs 22 are formed to extend toward the plane portions 10e and 10f of the bare cell 10 from three pairs of sides 20a, 20b and 20c opposite to each other.

At this time, the ribs 22 may be formed to extend by a length of 3 to 10 mm toward the plane portions 10e and 10f of the bare cell 10. If the ribs 22 are extended by 3 mm or less, the bare cell 10 is not sufficiently fixed by the ribs 22. In addition, shakes in the direction 'A' of FIG. 1 occur, and therefore, the inner frame 20 cannot be fixed at the exact position of the bare cell. If the ribs 22 are extended by 10 mm or more, the bare cell 10 is not easily fixed to the inner frame 20 by the ribs 22 when the bare cell 10 and the inner frame 20 are assembled. In addition, the thickness of the battery pack is increased.

In the assembled state of the bare cell 10 and the inner frame 20, the protection circuit module 30 is seated on the outside of the inner frame 20. At this time, the inner frame 20 and the protection circuit module 30 may be attached to each other by welding or insulating tape.

Figure 3:
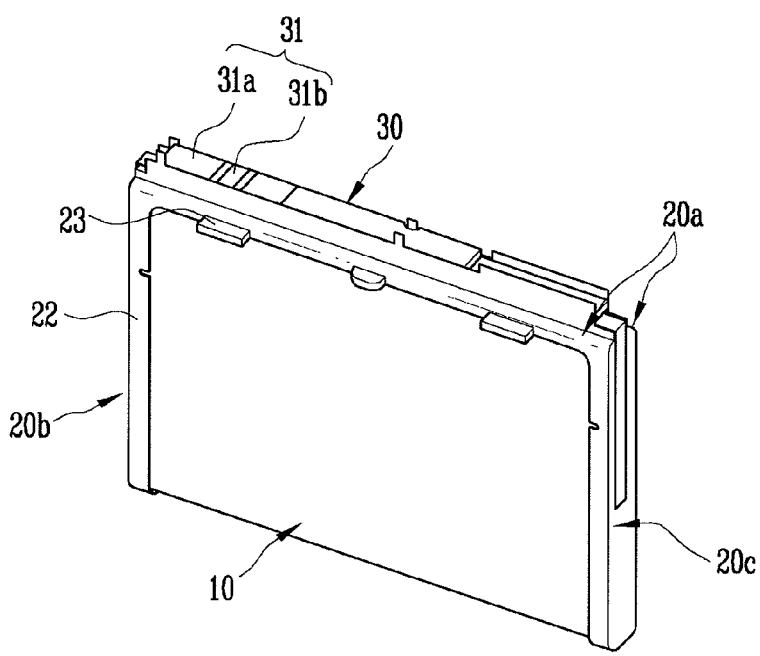
FIG. 3 is a perspective view illustrating the assembled state of a bare cell and an inner frame according to another embodiment of the present invention.

FIG. 3 is a perspective view illustrating the assembled state of a bare cell and an inner frame according to another embodiment of the present invention.

Referring to FIG. 3, the inner frame 20 is formed in a '⊏' shape so that a pair of plane portions 10e and 10f and one side portion 10b of first side portions 10a and 10b are exposed. Ribs 22 are formed to extend toward the plane portions 10e and 10f of the bare cell 10 from two pairs of sides 20b and 20c opposite to each other. That is, the ribs 22 are formed to extend toward the plane portions 10e and 10f of the bare cell 10 from the sides 20b and 20c of the inner frame 20, which come in contact with second side portions 10c and 10d of the bare cell 10.

Through the structure of the ribs 22 of the inner frame 20, the inner frame 20 can be fixed to the bare cell 10 without shaking in the direction 'A' of FIG. 1, thereby previously preventing process failures caused in assembling, such as position errors between components.

FIG. 4 is a perspective view illustrating the assembled state of a bare cell and an inner frame according to still another embodiment of the present invention.

Referring to FIG. 4, the inner frame 20 is formed in a '-' shape on one side portion 10a of the first side portions 10a and 10b. Ribs 22 are formed to extend toward plane portions 10e and 10f of the bare cell 10 from a pair of sides 20a opposite to each other in the inner frame 20. Although the ribs 22 are formed at only the one side portion 10a of the first side portions 10a and 10b in the bare cell 10, the inner frame 20 can be fixed at the exact position of the bare cell 10, like in the embodiments of FIGS. 2 and 3. Accordingly, it is possible to inhibit movements of the bare cell 10.

Figure 5:
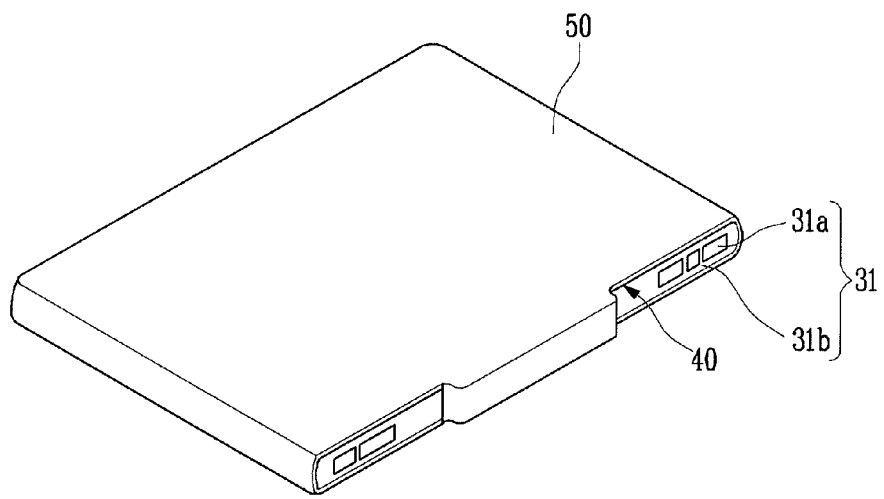
FIG. 5 is a perspective view of the battery pack according to the embodiment of the present invention.

FIG. 5 is a perspective view of the battery pack according to the embodiment of the present invention.

Referring to FIG. 5, after a core pack and an outer frame 40 are assembled, a taping member 50 may surround the outside of the assembled core pack and outer frame 40. The taping member 50 is used to reinforce the assembled state of the core pack and the outer frame 40. The taping member 50 may have the shape that partially surrounds only the connection portion between the outer frame 40 and the core pack, or may have the shape of a single sheet that surrounds the entire outer surface of the outer frame 40 and the core pack. Here, the shape of the taping member 50 is not particularly limited.

The taping member 50 may be a label for packaging, on which the discharge capacity of a secondary battery, its manufactured date and the like are printed. In addition, the taping member 50 has a function of protecting or insulating the secondary battery. The material of the label for packaging may include any one of synthetic resin, paper and the like, which are generally used as packaging materials. Preferably, a shrinkable tube is used as the material of the label for packaging.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
   a bare cell having a can that receives an electrode assembly, wherein the can of the bare cell also has a pair of first side portions opposite to each other, a pair of second side portions opposite to each other, and a pair of plane portions opposite to each other, the second side portions and the plane portions being connected to ends of the first side portions;
   a protection circuit module electrically connected to the bare cell;
   an inner frame provided between the bare cell and the protection circuit module, the inner frame having at least a pair of ribs opposite to each other while extending over a part of the plane portions of the can of the bare cell wherein the inner frame covers at least a portion of one of the first side portions of the can of the bare cell and at least a portion of the second side portions of the can of the bare cell and wherein the ribs extend over the part of the plane portions of the can of the bare cell adjacent the one of the first side portions so as to directly contact the plane portions of the can and the second side portions of the can of the bare cell; and an outer frame for accommodating the bare cell, the protection circuit module and the inner frame, the outer frame being formed so that the pair of plane portions of the bare cell are exposed and so that the outer frame overlies the inner frame over at least a portion of the second side portions of the bare cell wherein at least one of the pair of ribs of the inner frame extending over the part of the plane portion defines at least one protrusion that extends outward from the plane of the plane portion of the cells and wherein the outer frame defines an edge with at least one opening formed so as to extend from the edge and so as to be parallel to the plane of the plane portions of the bare cell and wherein the at least one protrusion is positioned within the at least one opening in the outer frame.

2. The battery pack according to claim 1, wherein an electrode terminal is formed at one side portion of the second side portions.

3. The battery pack according to claim 1, wherein the inner frame is formed at one side portion of the first side portions in the bare cell.

4. The battery pack according to claim 1, wherein the inner frame is formed at one side portion of the first side portions and the pair of the second side portions.

5. The battery pack according to claim 1, wherein the ribs are formed to extend by a length of about 3 to 10 mm toward the plane portions of the bare cell.

6. The battery pack according to claim 1, wherein the inner frame is formed of any one selected from the group consisting of polycarbonate (PC), polyethylene terephthalate glycol (PETG), polyethylene (PE), polypropylene (PP) and acrylonitrile-butadiene-styrene (ABS).

7. The battery pack according to claim 1, wherein the inner frame and the protection circuit module are attached to each other by welding.

8. The battery pack according to claim 1, wherein the inner frame and the protection circuit module are attached to each other by insulating tape.

9. The battery pack according to claim 1, wherein the outer frame is separately provided with an upper outer frame and a lower outer frame, and formed by connecting the upper and lower outer frames to each other.

10. The battery pack according to claim 1, wherein the outer frame is formed in a single body.

11. The battery pack according to claim 1, further comprising a taping member for surrounding the outside of the bare cell and the outer frame.

12. The battery pack according to claim 1, wherein the outer frame is formed of any one selected from the group consisting of PC, PETG, PE, PP and ABS.

13. A battery pack comprising:
a bare cell having a can that receives an electrode assembly wherein the can has a planar shape with two opposed first side portions and two opposed second side portions and a pair of plane portions;
a first frame that defines an opening and an outer surface wherein the first frame includes ribs that extend over a portion of the plane portions of the can and directly contact the plane portions of the can and are sized so as to receive the two opposed first side portions of the can and one of the second side portion of the can when the bare cell is positioned within the opening so that the first frame is mounted on the can of the bare cell; and
a protection circuit module that is mounted to the outer surface of the first frame when the first frame is mounted on the bare cell wherein the first frame covers at least a portion of one of the second side portions and at least a portion of both the first side portions of the bare cell; and
a second frame for accommodating the bare cell, the protection circuit module and the first frame, the second frame being formed so that the pair of plane portions of the bare cell are exposed and so that the second frame overlies the first frame over at least a portion of the second side portions of the bare cell wherein at least one of the ribs of the first frame extending over the part of the plane portion defines at least one protrusion that extends outward from the plane portions of the bare cell and wherein the second frame defines an edge with at least one opening formed so as to extend from the edge and so as to be parallel to the plane of the plane portion of the cells and wherein the at least one protrusion is positioned within the at least one opening in the second frame.

14. The battery pack of claim 13, wherein an electrode terminal is formed on one of the first side surfaces and wherein the protection circuit module is electrically connected to the electrode terminal.

15. The battery pack of claim 13, wherein the first frame defines a C-shape that defines the opening that receives the bare cell.

16. The battery pack of claim 13, further comprising the second frame that has an opening that receives the bare cell, the first frame and the protection circuit module wherein the protection circuit module is interposed between the first frame and the second frame.

17. The battery pack of claim 16, wherein the second frame has a first frame member and a second frame member that interconnect so as to be positioned about the first frame.

18. The battery pack of claim 16, wherein the first frame has at least one outwardly extending projection and the second frame has an opening that is positioned and sized so as to receive the projection to thereby couple the first and second frames together.

* * * * *